United States Patent [19]
Chen et al.

[11] Patent Number: 5,946,316
[45] Date of Patent: Aug. 31, 1999

[54] DYNAMIC DISTRIBUTED MULTICAST ROUTING PROTOCOL

[75] Inventors: Xiaoqiang Chen, Eatontown; Vijay Pochampalli Kumar, Freehold, both of N.J.; Cauligi Srinivasa Raghavendra, Pullman, Wash.; Ramanathan Venkateswaran, Holmdel, N.J.

[73] Assignee: Lucent Technologies, Inc., Murray Hill, N.J.

[21] Appl. No.: 08/785,625

[22] Filed: Jan. 17, 1997

[51] Int. Cl.[6] ................................................. H04L 12/56
[52] U.S. Cl. ........................... 370/408; 370/256; 370/432
[58] Field of Search ..................................... 370/256, 390, 370/400, 408, 432, 395; 340/825.02

[56] References Cited

U.S. PATENT DOCUMENTS

| | | | |
|---|---|---|---|
| 5,291,477 | 3/1994 | Liew | 370/408 |
| 5,351,146 | 9/1994 | Chan et al. | 370/408 |
| 5,541,927 | 7/1996 | Kristol et al. | 370/408 |
| 5,671,222 | 9/1997 | Chen et al. | 370/388 |

*Primary Examiner*—Alpus H. Hsu
*Assistant Examiner*—Ricky Q. Ngo
*Attorney, Agent, or Firm*—Frederick B. Luludis; Daniel J. Piotrowski

[57] ABSTRACT

The distribution of multicast information in a communications network formed from a plurality of communications nodes, e.g., ATM switches, is enhanced by providing an efficient mechanism for routing a request to join a multicast connection to an originator of the multicast and an efficient mechanism for then connecting the requester to the multicast connection.

12 Claims, 11 Drawing Sheets

DYNAMIC DISTRIBUTED MULTICAST ROUTING PROTOCOL

FIELD OF THE INVENTION

The invention relates to data networks and more particularly relates to a multicast protocol for locating, joining and leaving a multicast group that is receiving particular information.

BACKGROUND OF THE INVENTION

Presently, a user associated with a multimedia terminal, e.g., a conventional workstation or PC, may enter a request via the terminal to participate in a particular event, e.g., a lecture, audio/video conference, televised speech, etc., that is being provided by a node, e.g., a packet switch, in a digital network. The event is typically associated with some type of identifier, i.e., group identifier (e.g., 800 number or conference bridging number in conventional telephone networks) so that a user who wants to participate in the event may identify the event in a request that the user submits to his/her terminal. The user's terminal then forwards the request to an associated serving node within the digital network. A group identifier may represent a collection of users who are interested in particular information associated with the event. (Note that group identifier is different from an identifier that is used to identify a particular user.) Typically, the membership associated with a group identifier may be dynamic such that a member may join and leave the group at any time. Also, there is no restriction on the physical location of multicast group members who may or may not be at the same physical location. The network maintains information relating to the group and typically does this by constructing a network directory which is used to track the connectivity of active members. That is, a serving node submits the group identifier to the network directory. The directory, in turn, returns the address of the nearest node which it can join. The serving node then sends a request to join the multicast group to the identified node. A node that joins or leaves a multicast group must notify the directory so that it can update the membership information. Unfortunately, membership may change so frequently that management of such a directory may become costly and inefficient.

The network may also maintain such membership by constructing a multicast server in the network. Data that is sent by a user is then first delivered to the server, which, in turns, delivers the information to all other members in the multicast group. Although this approach appears to be simple to implement it, nevertheless, may lead to a single point of failure in the event that the server fails. Moreover, this approach does not use the network resources efficiently, since user data has to be sent to the server.

SUMMARY OF THE INVENTION

The foregoing is addressed and the relevant art is advanced by providing an efficient and scaleable mechanism for a data network to maintain multicast group information in a distributed fashion in which any node in the network may automatically locate, join and leave a multicast group. The mechanism is distributed so that a single node has to maintain complete information about the other participants of the multicast group. In particular, in accordance with an illustrative embodiment of the invention, a network node enters a request to join a multicast group, by constructing at least one routing tree formed from selected paths to each of a number of other nodes identified in the tree and sending a find message identifying the multicast group to the selected nodes in accordance with the routing tree. In response to receipt of a message identifying the nearest node connected to the multicast group, the requesting node then simply sends a join message to the identified node to join the multicast group.

These and other aspects of the claimed invention are disclosed in the ensuring detailed description, accompanying drawings and claims.

DETAILED DESCRIPTION

Our inventive protocol supports what we call a "Participant-Initiated Join", in which a node initiates a request to join a multicast group and, in doing so, determines the network path that is to be used to join the multicast. The protocol has two phases. We call the first phase the "Find" phase, since it is the requesting node that determines the identity of the nodes that are already on the multicast tree. We call the second phase the "Join" phase, since the requesting node attempts to join the nearest node that is already on the multicast tree. In the Find phase, a node that wants to join the multicast group originates a REQUEST message and sends it to all of its neighbors on the shortest path tree rooted at the requesting node. A neighbor that receives the message then forwards it downstream to its neighbors along the links of the shortest path tree rooted at the originating node. This process continues until the REQUEST message reaches either a node that is already on the multicast tree or a leaf node of the shortest path tree rooted at the originating node (i.e., the node that has the sought-after multicast information.) Each node that is already on the multicast tree replies to the request, with the cost parameter set to 0. The leaf nodes that are not on the multicast tree reply to the request with the cost parameter set to –1. On receiving all of the replies to the message, a node determines the nearest node and forwards the REPLY message from the nearest node upstream towards the originator of the REQUEST. Before doing so, the node updates the cost function to reflect the cost from this node to the nearest node. The originator receives all the replies and determines the nearest node. This ends the Find phase. In the Join phase, the requesting node determines the path to the nearest node and sends a JOIN-REQ message. The determined path is inserted in the message so that an intermediate node does not have to make the same determination. The nearest node (having the sought-after information) replies with a JOIN-ACK message and all the nodes in the path become a branch of the multicast tree.

Figure 1:
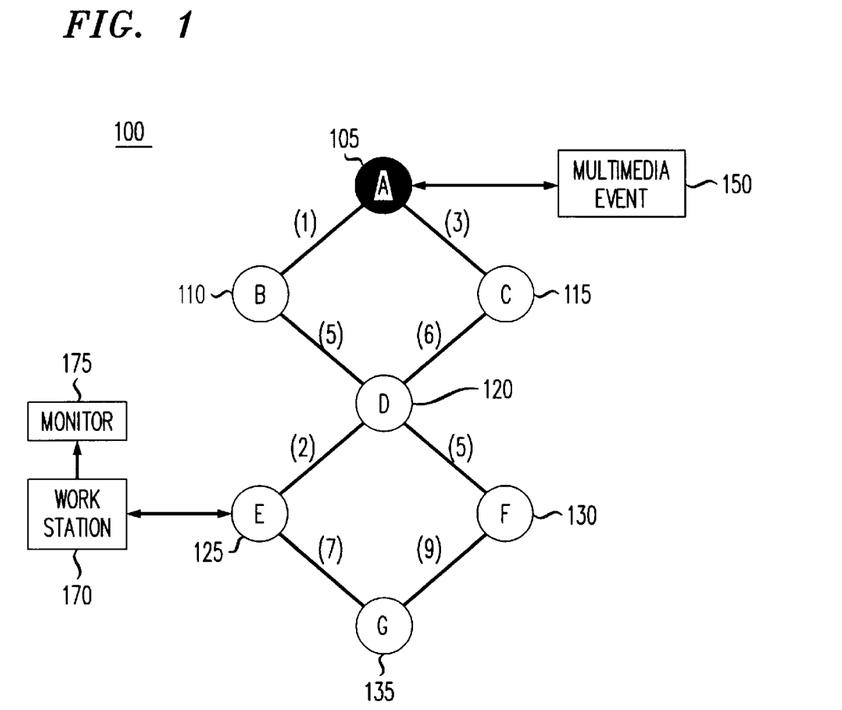
FIG. 1 shows a communications network in which the principles of the invention may be practiced.

An illustrative example of the foregoing is shown in FIG. 1, in which sought-after multicast information is assumed to be a multimedia event 150, e.g., a televised lecture. Multimedia signals characterizing the multimedia event are supplied to node 105, which may operate as a conventional video server for the purpose of supplying the video signal in the form of digital signals to a user who has entered a request to receive a copy of such signals via network 100 formed from data nodes 105, 110, 115, 120, 125, 130 and 135. In an illustrative embodiment of the invention, each of the nodes may be, for example, a conventional ATM switch. Assume that a user associated with workstation 170 in a conventional manner enters a request via a keyboard (not shown) to view the event on monitor 175, in which the request includes an identifier associated with the multimedia event. The request, however, does not contain the identity (e.g., address) of the source of the multicast information. Workstation 170, in response to receipt of the request, converts the request into a form expected by associated network node 125, also shown as the E node. As an aspect of the invention, network 100 does not include a directory identifying the information that is respectively supplied by the network 100 nodes. Accordingly, to locate the node that has the multicast information, node 125 will poll each of the other network 100 nodes. Before doing so, however, node 125 constructs a tree formed from selected paths to each of the other nodes, in which the selection is based on predetermined parameter, for example, cost, number of hops, etc. In an illustrative embodiment of the invention, cost is characterized by a weight value. Such weight values are shown in parentheses in FIG. 1 and are used, as mentioned, to identify a least cost path/route. For example, if node 120 (D) needs to send a message to node 105 (A), then node 120 will likely send the message via node 110 (B) since the sum of the weights associated with the links in that path is less than the sum of the weights associated with the links in the via node 115 (C) path, i.e., (5)+(1)<(6)+(3).

Figure 2:
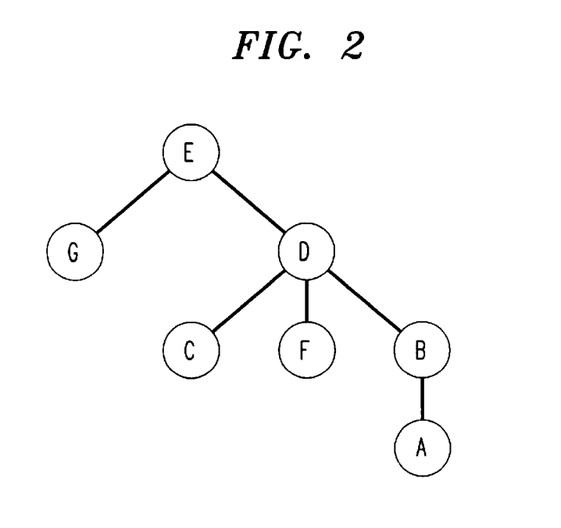
FIG. 2 illustrates a routing tree rooted at a particular one of the nodes of FIG. 1.

Thus, in accordance with known techniques, node 125, in the "find"phase, constructs a path tree and uses that tree to control the routing of a message to locate a node that has the requested multicast information, i.e., the televised event 150. An example of such a tree is illustrated in FIG. 2. Node 120 thus sends a "Find" message to node 135 (G) and to node 120(D) in accord with the tree. The "Find" message includes, inter alia, the address of the message originator, identifier associated with the sought-after information, a request for the identity of the node that has the sought-after information. The message may also include information characterizing the constructed path tree. Accordingly, then, upon receipt of the message, node 135 returns a Reply message with the cost parameter set to −1. Although node 120 does not have the sought-after information, it does not discard the message since the path tree indicates that the message should be individually routed to nodes 110, 115 and 130, as shown in FIG. 2. Similarly, when the message reaches node 110, the node does not discard the message (even though it does not have the sought-after information), but forwards it to node 105 (A). Since, it is assumed that node 105 has the sought after information, then it responds to the received message by returning to node 125 a reply message containing the identity (address) of node 105 and with the cost parameter set to 0.

Upon receipt of the latter message, node 125 enters the "Join" phase, as discussed above. In this phase, node 125 constructs the shortest path to node 105 and sends a Join message containing the node 125 address with a request to join the multicast of the identified event.

Referring to FIG. 2, it is seen that such path would be via nodes 110 and 120, rather than via nodes 115 and 120. Node 105 returns a Join-ACK and then starts supplying the televised event to node 125 via the determined path. When nodes 110 and 120, which are in the path of the multicast, start receiving the multicast information then they note in their respective internal memories that they also have such information.

Assume at this point that a user associated with node 130 also wishes to receive the multicast and enters a request for that information. Similarly, node 130 constructs a least-cost path tree and launches its own find message in accordance with the tree (not shown). When the message reaches node 120, it responds with a reply message to node 130 indicating that it has the information. As discussed above, node 130 accumulates the reply messages and then determines from those message which of the nodes having the sought-after information is closest to node 130. In the present illustrative example, the closest node for the desired purpose would be node 120. Accordingly, then node 130 may join the multicast by sending a Join message to node 120, rather than to node 105. Thus, when node 120 receives a packet of such information from node 110, it sends a copy to node 125 and a copy to node 130.

If at this point, the user at workstation 170 enters a request to terminate receipt of the multicast, then node 125 forms a "Leave" message and sends the message to node 120 in accordance with the constructed path tree rooted at node 125. When node 120 receives the message, it stores the message in local memory and terminates the supplying of the multicast information to node 125 but will continue supplying that information as it is received to node 130. If prior to the end of the televised event, node 130 launches a "Leave" message, then node 120, in response to that message and in response to having no other receiver for the multicast, sends a message to node 110 to terminate the supplying of the multicast to node 120. Similarly, node 110 sends a similar message to node 105 if it has no other receiver for the multicast information.

A situation could arise in which a node receives, at about the same time (concurrently), Find messages from a plurality of nodes, e.g., two nodes. To handle this situation and preserve the correctness of the distributed protocol, a node, e.g., node 125, appends a time stamp to a Find message. In this way, if a node, e.g., node D, receives concurrently "Find" message from nodes 125 and 130, then it processes the Find message bearing the earliest time stamp and returns a Reply message to the node, e.g., node 130, that launched the Find message bearing the latest time stamp. Then, when the least cost multicast path is established from node 105 to node 120, then node 130 launches a Find message after waiting a random (or a predetermined) period of time and then proceeds as discussed above.

Figure 3:
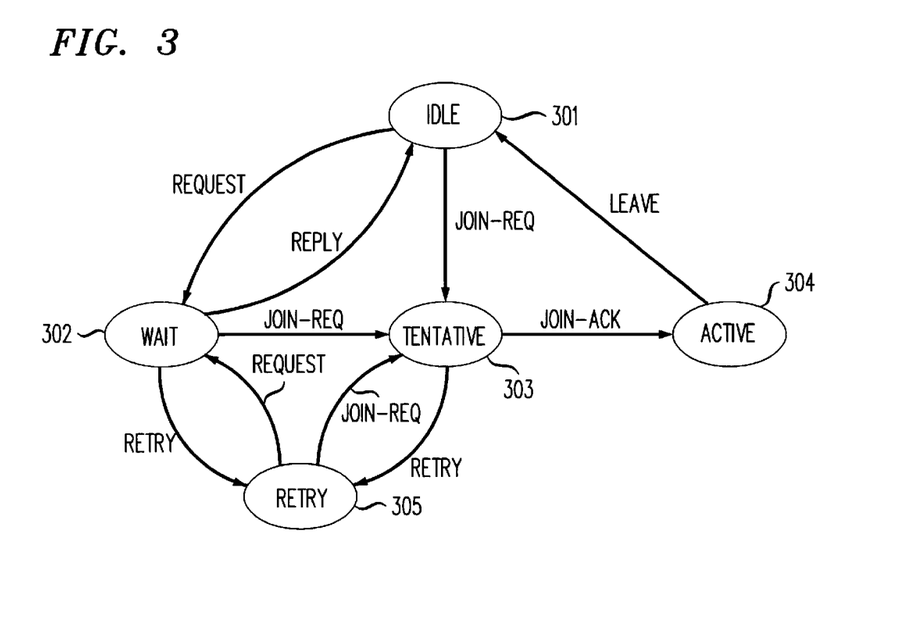
FIG. 3 shows a state diagram illustrating the operation of a node in accordance with the principles of the invention.

In an illustrative embodiment of the invention, the principles of the invention are embodied in a state machine which is implemented in each network node for each multicast group. An illustrative example of such a state machine is illustrated in FIG. 3 and is composed of five major states, namely IDLE 301, WAIT 302, TENTATIVE 303, ACTIVE 304 and RETRY 305. Before discussing FIG. 3, it would be best to review the different message(s) that may be sent by a node attempting to join a multicast and the message(s) that are sent by the other nodes in the network in response to a request to join a multicast session. Briefly, a node that wants to join a multicast tree/session sends a REQUEST message, in the manner discussed above. The header of the request message contains, inter alia, the identity of the multicast information, sender ID, and time-stamp. (It may also contain a retry count.) A request message can only be originated by a node that is in the IDLE state. A node sends a REPLY message in response to receipt of a REQUEST message. A REPLY message includes the header information of the REQUEST message and an associated cost parameter which identifies the cost of the shortest path from the current node to the nearest node that is already on the tree. The cost is updated as the REPLY moves from one node to another node. The cost is set to −1 if there is no ACTIVE node on that particular path. A node sends a RETRY message if it determines that another request is already being processed, as discussed above. The request with the earlier time-stamp is allowed to continue while a RETRY message is sent to the originator of the request having the later time stamp, as mentioned above. A node sends a JOIN-REQ message when it wants to join the multicast session/tree. The path to the nearest node is encoded within this message. An ACTIVE node sends a JOIN-ACK message in response to receiving a JOIN-REQ message. The receipt of this message indicates that a node is on the multicast tree. A node sends a LEAVE to an ACTIVE neighbor node when it wants to leave the multicast session/tree.

Turning then to FIG. 3, Briefly, in the IDLE state a node has no information pertaining to the multicast information (or tree). A node enters the WAIT state after it has sent/forwarded a REQUEST message and is waiting for a response. A node enters the TENTATIVE state after it has sent/forwarded a JOIN-REQ message towards the nearest node that is already on the multicast tree. In this state, the node is waiting for a JOIN-ACK message. A node enters the ACTIVE state when it joins a multicast session (i.e., it is on the multicast tree. A node reaches this state when it receives a JOIN-ACK message from a node that is already on the tree. A node in the ACTIVE state may also maintain the tree-based information regarding all the links that are incident on it and belong to the tree. However, the node does not maintain any state information about new requests to join the tree. A node reaches the RETRY state when it is the originator of a REQUEST to join a multicast tree and receives a RETRY message via one of the links of the tree. In this state, a node does not have to maintain any state information relating to other requests. Also, the node waits for a random period of time before re-sending the original REQUEST. It may also track the number of REQUEST messages that it sends.

Figure 4:
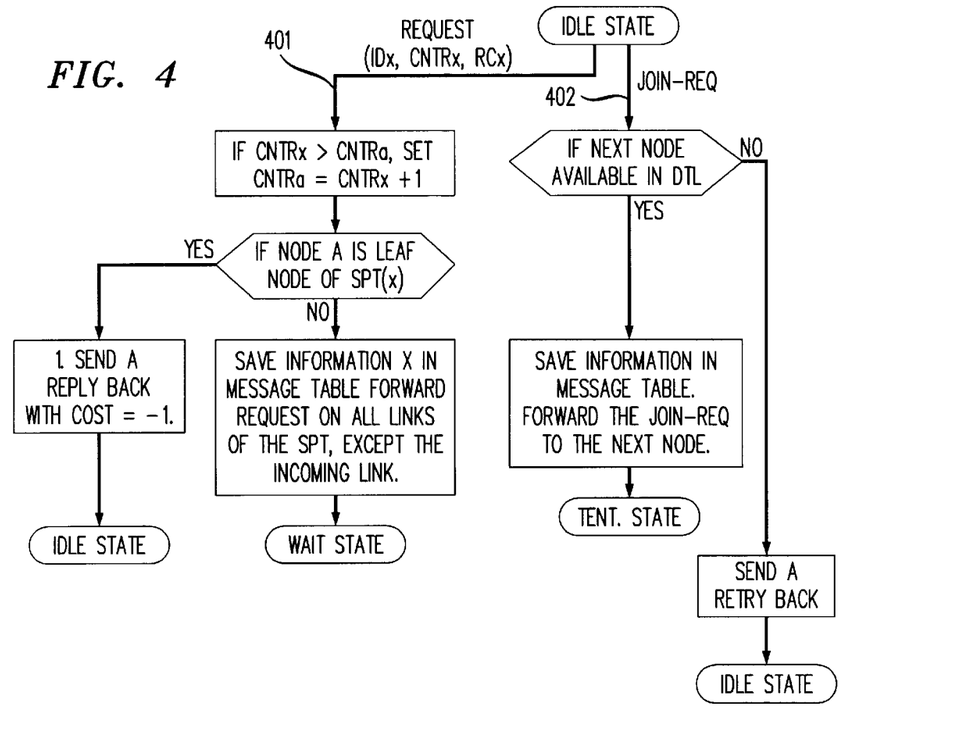
FIGS. 4–9 are respective expanded versions of the operations states shown in FIG. 3, and FIGS. 10–15 illustrate the operation of the principles of the invention in an illustrative hierarchical network.

An expanded version of the IDLE state is shown in FIG. 4. As mentioned above a node initiates a REQUEST message when it is in the IDLE state.

A node in this state only can initiate a REQUEST message. A REQUEST message is identified using the tuple<senderID,time-stamp,retry-count>, where senderID is the ID of the node that is the originator of the message, time-stamp is the value of a counter at the senderID and retry-count is the number of attempts the node has made to join the tree. The retry-count is initially 0. The initial REQUEST message is forwarded on all the links via the shortest-path tree rooted at the originating node. The node then enters the WAIT state. The following actions are taken when the node receives either a REQUEST message (action path 401) or JOIN REQ message (action path 402). For example, assume that a REQUEST message is received from node B, and therefore contains the tuple<$ID_B$,$CNTR_B$,$RC_B$>. Then the receiving node takes the following actions:

If the message is not on the shortest path, then send a REPLY with cost=−1 towards the originator. Else, update the time stamp (local counter).

Save the state information of the message.

Forward the REQUEST message. Change State=WAIT.

If no available link, send REPLY with cost=−1. State=IDLE.

If a JOIN-REQ message is received from node B, then the receiving node proceeds as follows:

Forward JOIN-REQ message to next node. Change State=TENTATIVE.

If current node is the final destination noted in the message, then return a RETRY message to the originator. (Note that this condition may arise if the node changes its state from ACTIVE to IDLE during the time between the sending of the REQUEST message and JOIN-REQ message to node B.)

Figure 5A:
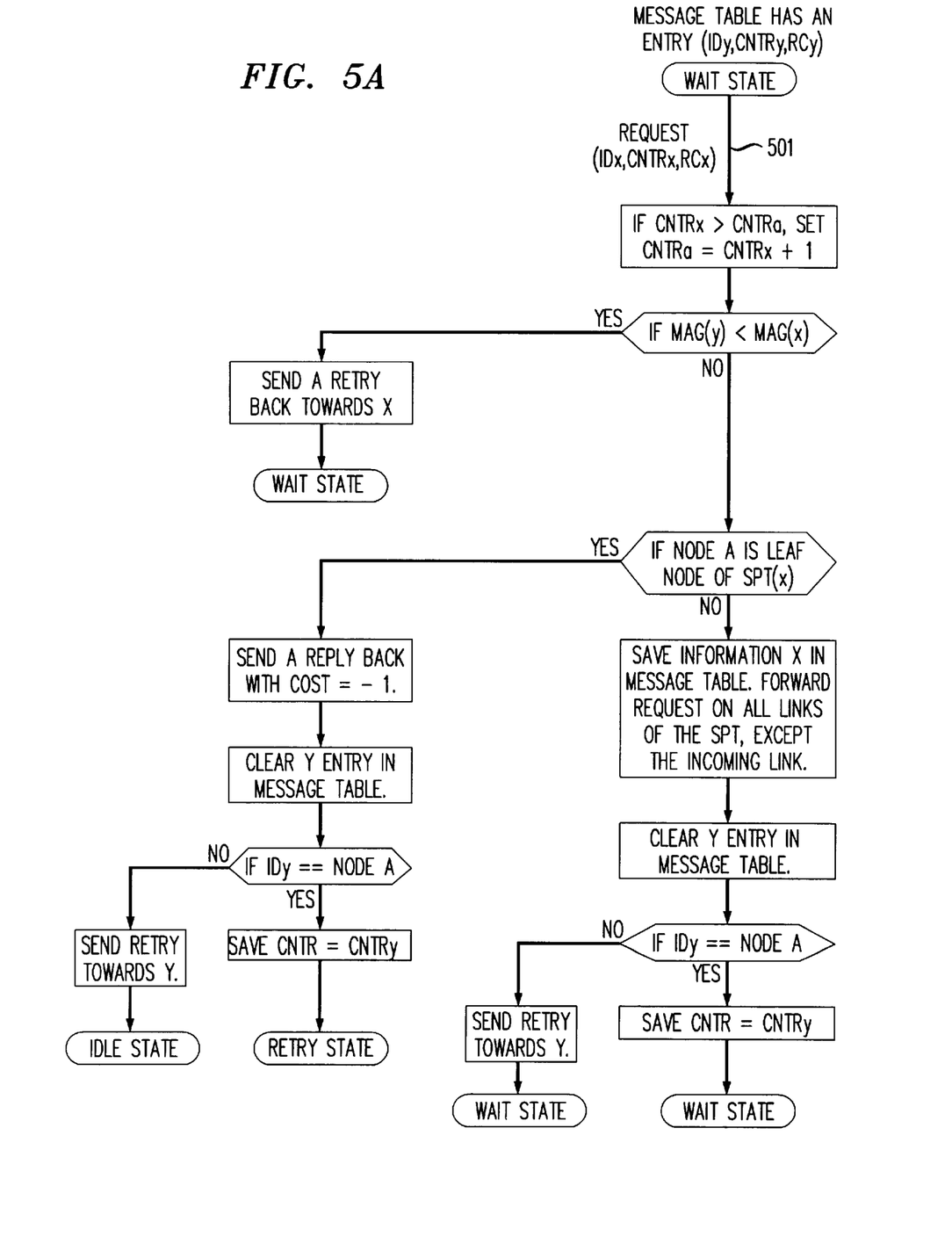
Figure 5B:
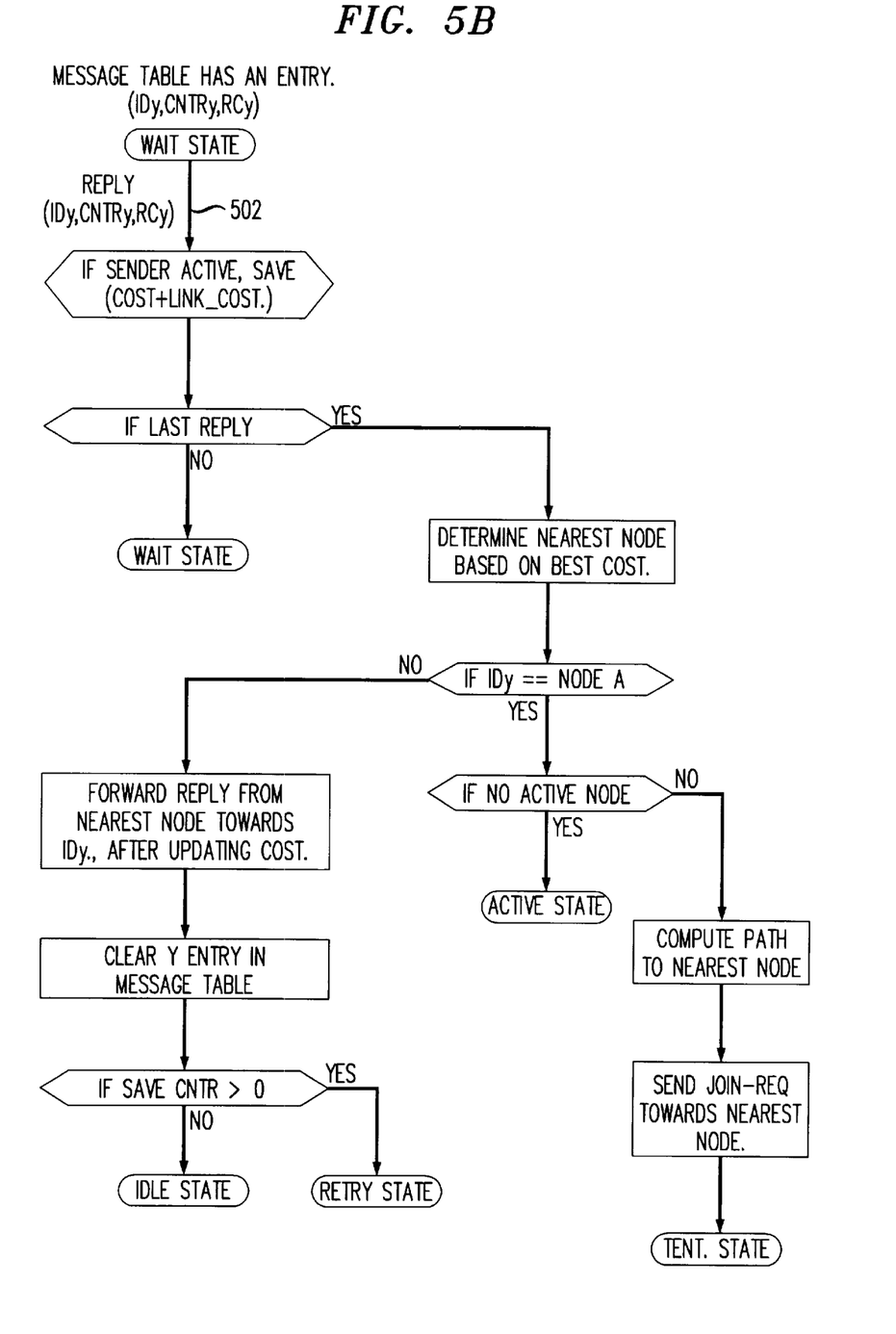
Figure 6:
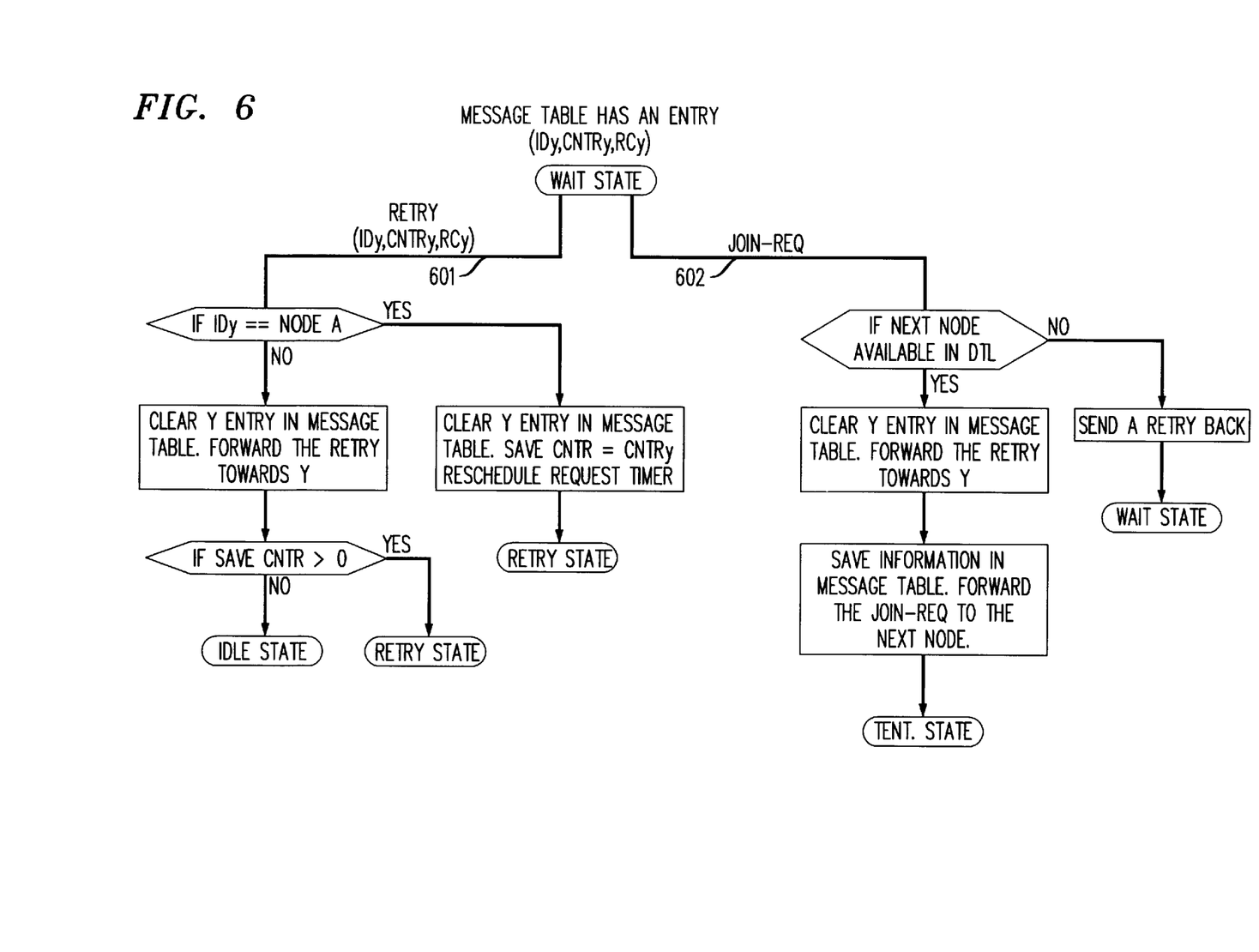

An expanded version of the WAIT state is shown in FIGS. 5A, 5B and 6. For FIGS. 5A and B, assume that a node received a REQUEST message containing the tuple <$ID_A$, $CNTR_A$,$RC_A$>from node A.

If the node also receives a REQUEST message from node B, <$ID_B$,$CNTR_B$,$RC_B$>. Then the node takes the following actions (path 501):

Update the local time stamp counter.

If the message had not been received via the shortest path, then send a REPLY to B, setting cost to −1.

If the message is received via the shortest path and A precedes B in time, then send a RETRY message to B.

If the message is received via the shortest path and B precedes A in time, then send a RETRY message to A. Clear state information pertaining to A. Save information pertaining to B and forward REQUEST message.

If the node receives a REPLY message via one of its links, then the node takes the following actions (path 502):

Ignore the REPLY message if it does not contain state information.

If not the last reply, then store the cost information and wait for other reply messages.

If the last REPLY, then determine best message by minimizing the (cost field of message+link cost). Then forward the best message towards the originator of the REQUEST after updating cost.

Change state=IDLE.

If originator of REQUEST message, then compute the shortest path to the nearest node. Send JOIN-REQ message towards that node via the shortest path. Change state=TENTATIVE.

If the node receives a RETRY message via one of its links, then the node takes the following actions (path 601, FIG. 6):

Ignore the RETRY message if it does not contain state information.

Clear the state information and forward the RETRY message towards the originator of REQUEST.

Change state=IDLE.

If originator of REQUEST, then change state=RETRY. Increment retry count.

Wait for a random period of time, then resend the REQUEST message with the updated retry count value. (Note: The same counter value (CNTR) will be used to ensure fairness.)

If the node receives a JOIN-REQ message from a node, e.g., node B, then the node proceeds as follows (path 602, FIG. 6):

Change state=TENTATIVE.

If next node information is available, then forward the JOIN-REQ message to the next node and send a RETRY message to node A.

If no next node, then send a RETRY message towards the originator of the JOIN-REQ message.

Figure 7:
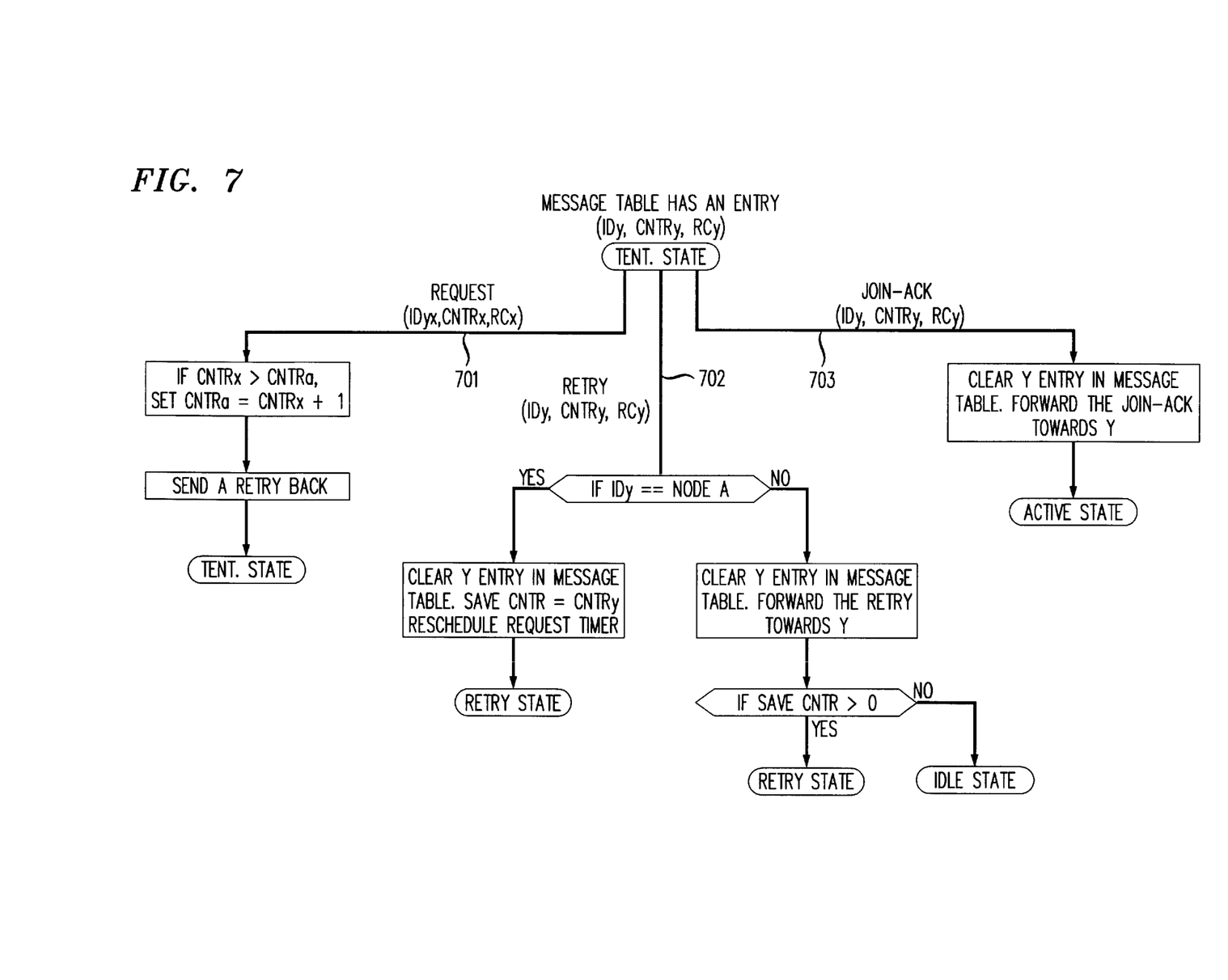

An expanded version of the TENTATIVE state of FIG. 3, is shown in FIG. 7, in which a node enters the TENTATIVE State after it receives a JOIN-REQ message originated by another node, e.g., node A. If at that time, the node receives a REQUEST message from node B containing the tuple<$ID_B$,$CNTR_B$, $RC_B$>, then the receiving node proceeds in the following manner (path 701):

If a REQUEST message is not received via the shortest path, then return a REPLY with cost =−1 to the originator. Else, Update local counter value.

Send RETRY message towards the originator of the message.

If, on the other hand, the node receives a RETRY Message, then the node takes the following actions (path 702):

If RETRY matches JOIN-REQ, forward RETRY message back towards node A.

Change state=IDLE.

Ignore if RETRY message does not match JOIN-REQ.

If the node otherwise receives a JOIN-ACK Message, then the node takes the following actions (path 703):

Change State=ACTIVE.

Forward Join-Ack to node A.

Clear all state information.

Update multicast tree information to include the link over which the JOIN-REQ was received.

Figure 8:
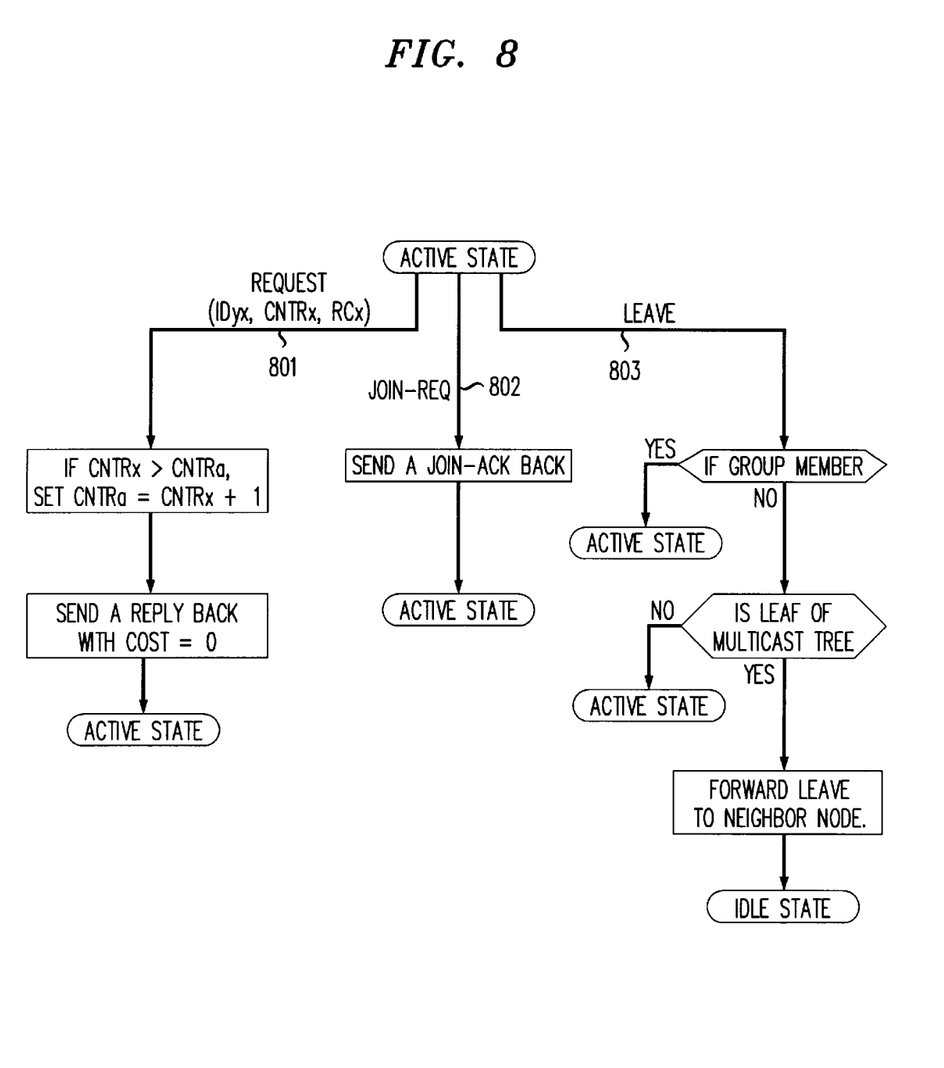

An expanded version of the ACTIVE state of FIG. 3, is shown in FIG. 8, in which a node is already on the multicast tree. In that case, the node only responds to new requests and join requests. Other messages may be ignored.

If a node in the active state receives a REQUEST message from node B a containing the tuple<$ID_B$,$CNTR_B$, $RC_B$>, then the receiving node takes the following action (path 801):

If the REQUEST message is not received via the shortest path, then send REPLY message with cost=−1 to the originator. Else, Update local counter value.

Send a REPLY with cost=0.

If, on the other hand, the node receives a JOIN-REQ message from node B, then the node returns a JOIN-ACK message to B (path 802). If the node otherwise receives a LEAVE message from node B, then the node takes the following actions:

Update multicast tree information.

If only one ACTIVE neighbor and the node is not member of multicast group, then send LEAVE message to neighbor.

Change state=IDLE.

Figure 9:
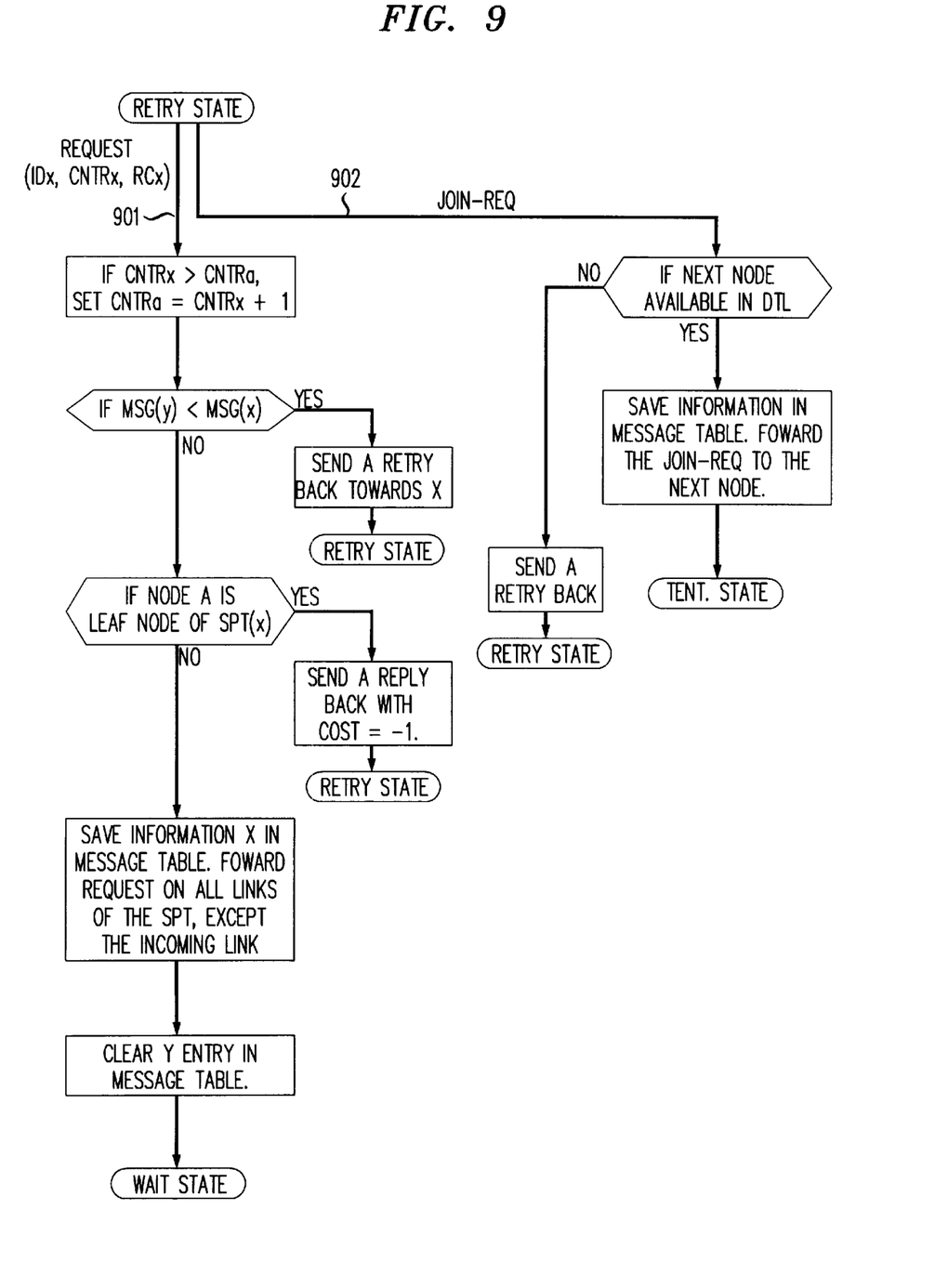
Figure 10:
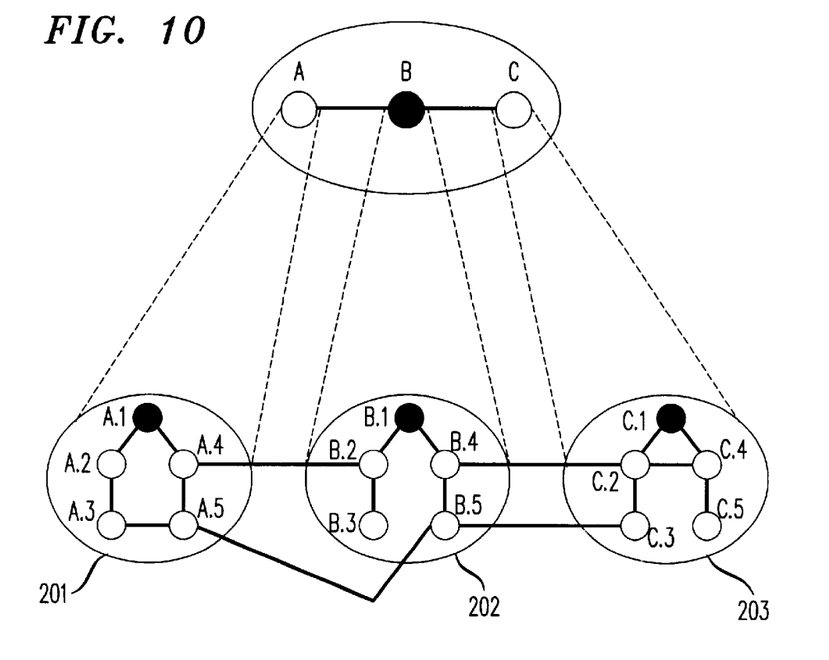

An expanded version of the RETRY State is shown in FIG. 9. A node enters the RETRY state after sending a REQUEST message. Assume that node A is in the retry state and the associated tuple information is—<$ID_A$,$CNTR_A$, $RC_A$>, and that node A receives a REQUEST message from node B whose tuple information is<$ID_B$,$CNTR_B$,$RC_B$>. For that case, node A takes the following actions (path 901):

If message is not on the shortest path, send a REPLY back with cost set to −1. Update local counter.

If A precedes B in time, then send a RETRY message towards node B.

If B precedes A in time, then save B's state information and forward the REQUEST message. Save A's information and stop A's retry timer. (A cannot join the multicast group until B has joined).

Change state=WAIT. (A is now waiting for B)

If, on the other hand, a JOIN-REQ message is received from node B, then the node takes the following actions (path 902):

Change state=TENTATIVE. Forward JOIN-REQ message to next node on the path.

Save A's information and wait. (A cannot resend REQUEST message until B has joined multicast group).

If Retry timer has expired, then increment Retry count and send REQUEST message containing the following tuple; <$ID_A$,$CNTR_A$,$RC_A$>.

The old value of $CNTR_A$ is used to ensure fairness.

The foregoing may be readily implemented in a network formed from a plurality of so-called Peer groups, in which a peer group is a group of network nodes forming a smaller network. In particular, a large network formed from a large number of nodes may be logically restructured to improve the efficiency of the number. Such restructuring entails forming nodes into groups each operating as a smaller network, in which connection management functions are logically extended to each level of the network hierarchy. The state information is maintained at each physical node. In addition, each group is represented as a logical node at a higher level of the network hierarchy by a peer group leader (PGL). The PGL maintains separate state information for that logical node at that hierarchical level. The logical nodes perform the same state transitions as the physical nodes at the lowest level of the network hierarchy. In that sense, our inventive protocol may be applied to such a network with the following modifications (extensions).

Find Phase i) A Joining Node prompts (requests) its PGL to enter the "Find" phase at the next higher level of the hierarchy. At the logical level, pre-established virtual connections between logical nodes are used to send the REQUEST and REPLY messages. During the "Find" phase, the logical nodes may make a transition from the IDLE state to the WAIT state and RETRY state similar to the physical nodes.

ii) If the PGL is already active at the higher level (which may mean that some other ACTIVE node exists in the peer-group), then this information is returned to the requesting node. On receipt of the information, the requesting node executes the protocol to determine the nearest ACTIVE node within the peer-group. The ID of the nearest ACTIVE node (physical or logical) is returned to the lower level requesting node. If the current level is the lowest level, then the requesting node enters the "Join" phase.

iii) Otherwise, the PGL recursively executes the above steps at higher levels until it reaches the top level of the hierarchy. At that level, the PGL enters the "Find" phase. At the end of the "Find" phase, the requesting node has the ID of the nearest ACTIVE node. (Note that this ID may either be the physical ID of the node within the same peer-group (single peer group case) or the logical ID of a higher level node in a logical peer-group (multiple peer group case).

Join Phase

Based on the available topological information, a requesting node determines the path to the nearest node. The path may not be complete if the nearest node is a logical node in a higher level, logical peer-group. The determined path is stored in the form of a Designated Transit List (DTL), as discussed in the Private Network-Network Interface (PNNI) specification version 1.0, available from the ATM Forum, 2570 West El Camino Real, Suite 304, Mountain View, Calif. 94040-1313, which is hereby incorporated by reference. The DTL is embedded in the JOIN-REQ message before it is forwarded to the nearest node. On receiving a JOIN-REQ message, a node executes the following protocol:

1) If the node is already ACTIVE, it returns a JOIN-ACK message. The JOIN-ACK is returned along the same path (in the reverse direction) to originating node.

ii) Else, if the DTL stack is not empty, then the JOIN-REQ message is forwarded to the next node based on the information available in the DTL. (Note that new paths may be added to the DTL by ingress nodes, as explained in the above-mentioned reference. Also note that the JOIN-REQ and JOIN-ACK messages may be sent on network signaling channel. When the JOIN-REQ or JOIN-ACK messages are sent across border links, the logical node at the appropriate level has to be informed so that the logical node can make a state transition to the TENTATIVE or ACTIVE state respectively. This is done by sending a copy of the JOIN-REQ or JOIN-ACK message to the appropriate logical node.

iii) If the DTL stack is empty, then the node enters the "Find" phase to determine the nearest ACTIVE node. The nearest node information is then encoded as DTL and the message is forwarded to the nearest node.

Similar actions are taken when a participating node leaves the multicast group. In this case a LEAVE message is sent to an ACTIVE neighbor node, provided that the participant has only one ACTIVE neighbor. The participant node then enters the IDLE state. The neighbor node may then forward the LEAVE message to its nearest neighbor if it is not a participant and has only one ACTIVE neighbor. When a LEAVE message is sent across a border link, then a copy of the message is sent to the appropriate logical node, so that the global state of the node can be changed to the IDLE state.

The extended protocol described immediately above may be further appreciated when discussed in conjunction with the examples illustrated in FIGS. 10 through 13, in which each FIG. illustrates a network formed from three peer groups of network nodes (e.g., ATM switches) 201, 202 and 203. The nodes in peer group (a) 201 are respectively designated A.1 through A.5, (b) 202 are respectively designated B.1 through B.5 and (c) 203 are respectively designated C.1 through C.5. The dark (or filled in) node serves as the PGL for the respective peer group in each of FIGS. 10 through 13. Assume for FIG. 10 that node A.3 wants to join a multicast group, and, therefore sends a request to that effect to its PGL (node A), which causes that PGL to enter the "Find" phase at the higher level as noted by the ellipse containing logical PGLs A, B and C. Since PGL A enters the highest level, it sends a REQUEST message to the other members of its peer-group to determine who has the requested multicast information. Assume that PGL A determines that there are no members of the multicast in peer-groups B and C. This information is passed on to node A.3 and the state of node A.3 becomes ACTIVE. The multicast tree now consists of a single node A.3. Globally, the state machine for logical node A also makes a transition to the ACTIVE state. The ACTIVE nodes at each level are shown as boxes in FIG. 11. The participant nodes at each level are shown as lightly shaded boxes.

Figure 11:
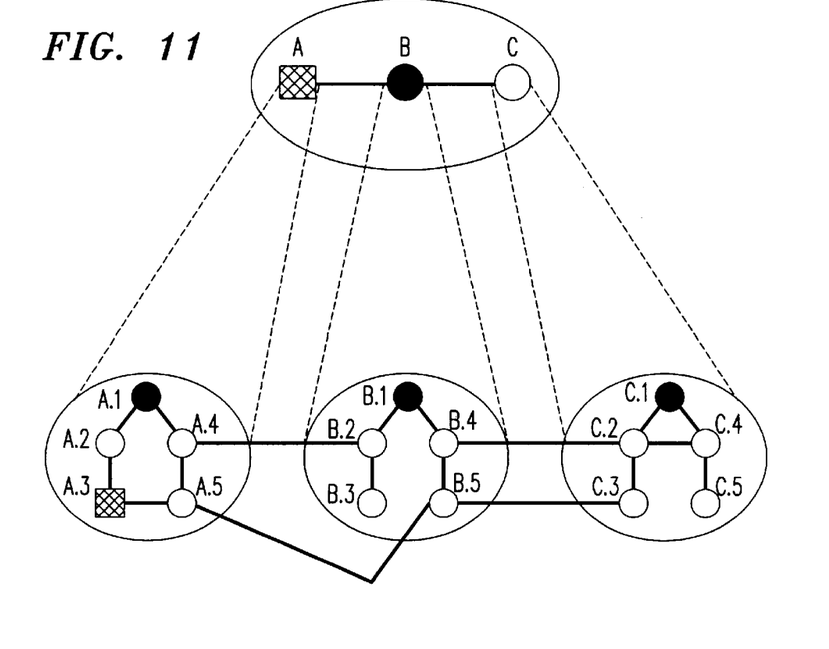
Figure 12:
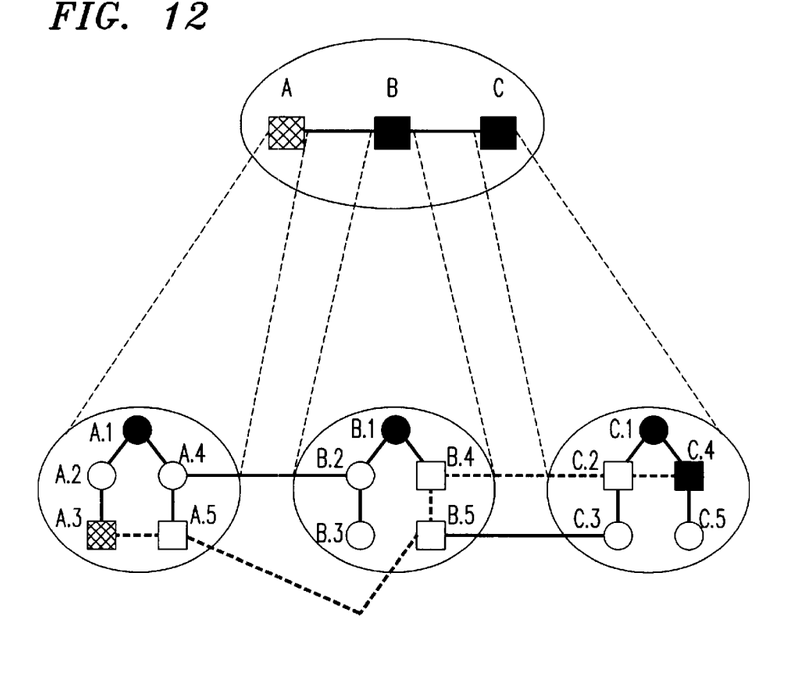

Assume that node C.4 now wants to join the multicast group, and, therefore sends a request to its PGL (node C) to enter the "Find" phase. Node C, in response thereto, sends a REQUEST message to logical node B and logical node A. (Note that node C may enter the RETRY state if there is a concurrent Join request from logical node B.) If there are no other requests, then only logical node A is ACTIVE and this information is sent to node C.4 by logical node C. This action completes the "Find" phase for node C.4.

Figure 13:
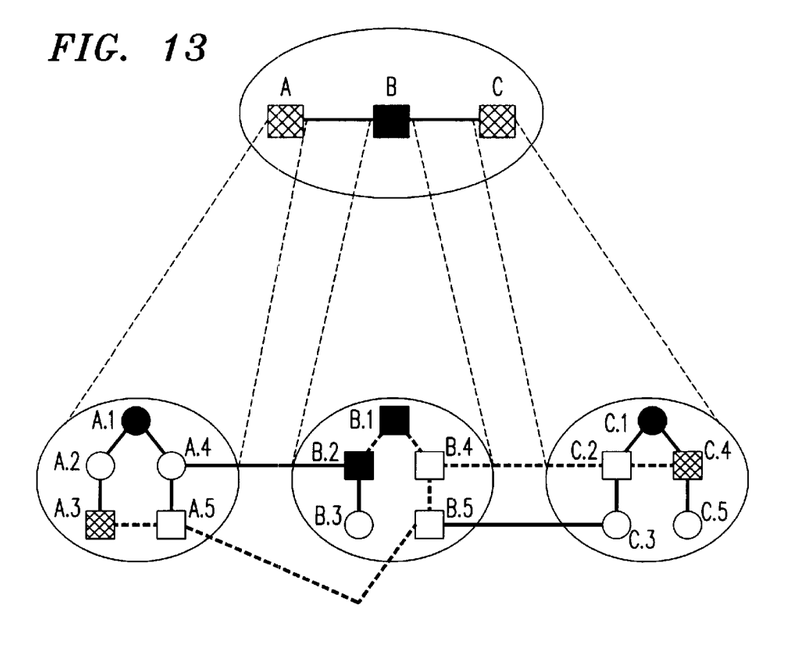

In the "Join" phase, node C.4 encodes a path to peer-group A as a DTL and forwards a JOIN-REQ message to peer-group A. The message enters peer-group B, across the border link (C.2—B.4). Here, node B.4 is the ingress node and the DTL stack is not empty (step (ii) of the "Join" phase). Node B.4 identifies a path through its peer-group to peer-group A and appends the path to the DTL. It then forwards the message towards peer-group A. Node B.4 also sends a copy of the JOIN-REQ message to the PGL node B.1, which maintains the global state machine for logical node B. Node B.1 updates the global state machine of node B to TENTATIVE state. Assume that the message enters peer-group A across link (B.5—A.5). The DTL stack is now empty (step (iii) of the "Join" phase). Node A.5 upon receipt of the message enters the "Find" phase to determine the nearest node that should receive the message, i.e., node A.3. It then appends the path to node A.3 to the DTL and forwards the JOIN-REQ to node A.3. Node A.3, being in the ACTIVE state, replies to receipt of the message by returning a JOIN-ACK message (step (i) of the "Join" phase). The JOIN-ACK messages retraces the path followed by the JOIN-REQ message. When the JOIN-ACK crosses the border link (A.5—B.5), the state machine of logical node B is updated to the ACTIVE state. Logical node C becomes ACTIVE when the JOIN-ACK message is sent across link (B.4—C.2). The resulting multicast tree is shown as dotted lines in FIG. 12. Node B.2 can now join the multicast tree by joining node B.4, as shown in FIG. 13.

Figure 14:
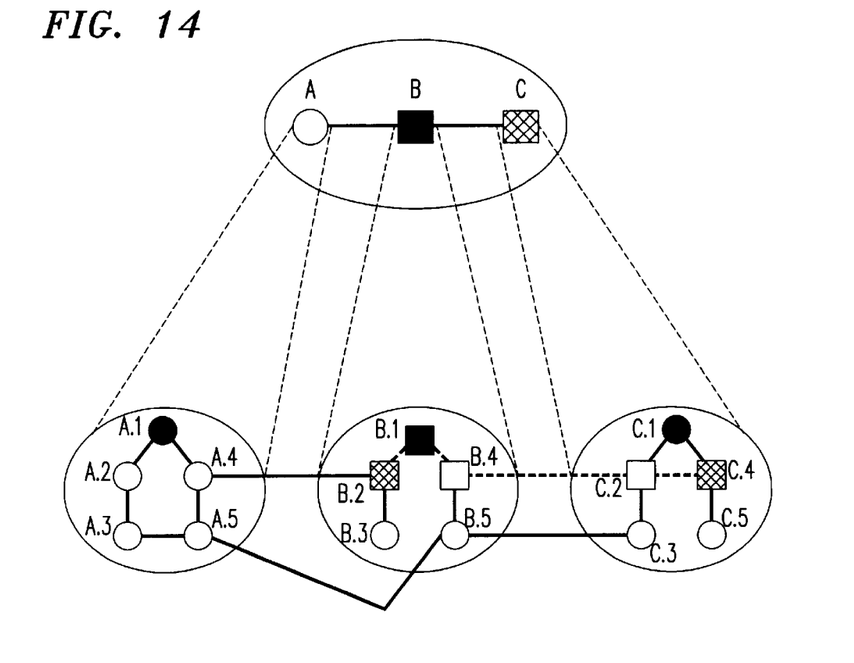
Figure 15:
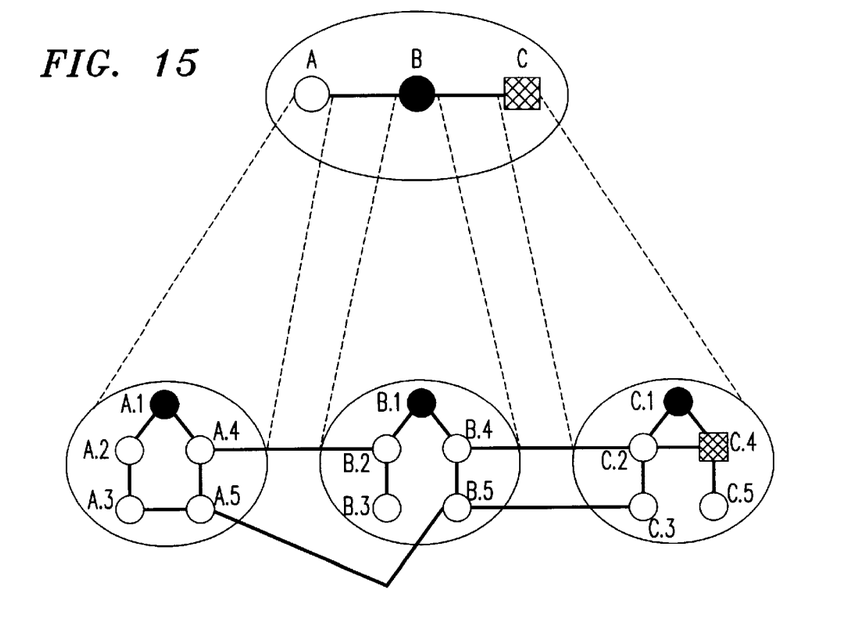

If participant A.3 leaves the multicast group, then it sends a LEAVE message to node A.5, which propagates the message to node B.5. Node A.5 also sends a copy of the LEAVE message to node A.1, so that the global state machine of logical peer-group A may be changed to the IDLE state. Node B.5 also sends a LEAVE message to node B.4. However, the propagation of the latter message stops at node B.4 since that node has two ACTIVE neighbors, nodes B.1 and C.2. The resulting tree is shown in FIG. 14. Assume now node B.2 similarly leaves the multicast group. In this instant the LEAVE message propagates to node C.4. Recall that when the LEAVE message is sent across link B.4—C.2, a copy is also sent to node B.1 so that the global state machine for the peer-group may be changed to IDLE state. The final tree consisting of only node C.4 is shown in FIG. 15.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of joining a multicast connection originating from a source node distributing multicast information, said multicast connection being established in a network composed of a plurality of communications nodes, said method comprising the steps of:

at one of said nodes, responsive to receipt of a request to receive said multicast information, constructing at least one routing tree formed from selected paths to each of a number of other nodes identified in the tree and sending a message identifying said multicast information to the selected nodes in accordance with the routing tree, and at said one node, responsive to receipt of a message identifying said source node as being the originator of the identified multicast information, sending a message containing a request to join multicast distribution of the identified multicast information.

2. The method of claim 1 further comprising the steps of at the source node, responsive to receipt of a message containing a request to join the multicast distribution of the identified information, returning an acknowledgment message to the originator of the message.

3. The method of claim 1 further comprising the steps of at the source node, responsive to receipt of a message containing a request to join the multicast distribution of the identified information, constructing a network path tree rooted at the source node and extending to the node originating the message, and supplying the multicast information via the path tree rooted at the source node.

4. The method of claim 3 wherein said multicast tree includes at one intermediate node between the source node and the node originating the message and wherein said method further comprises the steps of at the intermediate node, responsive to receiving from another one said nodes a message containing a request for said multicast information, returning to said other one of said nodes a reply message indicating that said intermediate node can supply said multicast information, and at said other one of said nodes accumulating all reply messages to its request for the multicast information and determining which of nodes returning a reply message is closest to said other one of said nodes, and sending a message to join the multicast to the determined closest one of the nodes that returned a reply message to said other one of said nodes.

5. The method of claim 4 further comprising the step of at the closest one of the nodes, responsive to receipt of the join message and thereafter responsive to receipt of multicast information via the path tree rooted at the source node, sending a copy of the received multicast information to the other one of said nodes.

6. The method of claim 5 wherein said intermediate node is said closest one of the nodes and wherein said method further comprises the steps of at said intermediate node, responsive to receiving from said one node a message addressed to said source node and requesting a termination of the sending of the multicast information to said one node, terminating the sending of the multicast information to said one node and continuing to supply the multicast information as it is received to said other one of said nodes.

7. The method of claim 5 wherein said intermediate node is said closest one of the nodes and wherein said method further comprises the steps of at the intermediate node, responsive to receiving from said other one of said nodes a message addressed to said source node and requesting a termination of the sending of the multicast information to said other one of said nodes, terminating the sending of the multicast information to said other one of said nodes, and responsive to having no other recipient for said multicast information, sending the received termination message to the source node.

8. A method of joining a multicast connection originating from a source node distributing multicast information, said multicast connection being established in a network composed of a plurality of communications nodes, said method comprising the steps of at a network node, responsive to receiving from first and second other ones of the network nodes respective message requests to join the multicast, determining as a function of a predetermined parameter a first one and a second one of the first and second nodes, said first one is to be connected first to the multicast connection and sending a wait message to said second one, forwarding the message received from said first one over a path contained in that message, and thereafter, responsive to receipt of multicast information from a source via a path rooted at the source, supplying the multicast information to said first one.

9. The method of claim 8 further comprising the steps of at said other one of said first and second nodes, response to receipt of the wait message, waiting a predetermined period of time, and at the expiration of that period of time, again sending a message requesting receipt of the multicast information.

10. The method of claim 9 further comprising the step of at said network node, responsive to receipt of the request message from said other one of said first and second nodes, supplying said multicast information to said other one of said first and second nodes as it is received from the source.

11. The method of claim 9 further comprising the steps of at said network node, responsive to receiving from said one node of said first and second modes a message addressed to said source node and requesting a termination of the sending of the multicast information to said one of said first and second nodes, terminating the sending of the multicast information to that node and continuing to supply the multicast information as it is received to said other one of said first and second nodes.

12. The method of claim 9 further comprising the steps of at said network node, responsive to receiving from said other one of said first and second nodes a message addressed to said source node and requesting a termination of the sending of the multicast information to said other one of said first and second nodes, terminating the sending of the multicast information to said that node, and responsive to having no other recipient for said multicast information, sending the received message requesting termination to the source node.

* * * * *